United States Patent
Mita

(10) Patent No.: US 8,378,524 B2
(45) Date of Patent: Feb. 19, 2013

(54) NON-CONTACT POWER TRANSMISSION DEVICE

(75) Inventor: Hiroyuki Mita, Saitama (JP)

(73) Assignee: Sony Corporation, Tokyo (JP)

( * ) Notice: Subject to any disclaimer, the term of this patent is extended or adjusted under 35 U.S.C. 154(b) by 187 days.

(21) Appl. No.: 12/551,877

(22) Filed: Sep. 1, 2009

(65) Prior Publication Data

US 2010/0052431 A1 Mar. 4, 2010

(30) Foreign Application Priority Data

Sep. 2, 2008 (JP) ................................. 2008-225295

(51) Int. Cl.
H01F 37/00 (2006.01)
(52) U.S. Cl. ...... 307/104; 307/149; 307/151; 363/21.02
(58) Field of Classification Search .................. 307/104, 307/149, 151; 363/21.02
See application file for complete search history.

(56) References Cited

U.S. PATENT DOCUMENTS

| | | | | |
|---|---|---|---|---|
| 4,980,663 A * | 12/1990 | Moyer | ............................... | 334/8 |
| 5,898,579 A * | 4/1999 | Boys et al. | ....................... | 363/23 |
| 6,275,131 B1 * | 8/2001 | Swope et al. | .................... | 336/20 |
| 7,239,110 B2 * | 7/2007 | Cheng et al. | ................... | 320/108 |
| 7,310,245 B2 * | 12/2007 | Ohbo | ......................... | 363/21.02 |
| 2004/0130915 A1 * | 7/2004 | Baarman | ..................... | 363/21.02 |
| 2004/0134985 A1 * | 7/2004 | Deguchi et al. | ............... | 235/451 |
| 2005/0163112 A1 * | 7/2005 | Rieckmann | .................... | 370/362 |
| 2007/0216392 A1 * | 9/2007 | Stevens et al. | ................ | 323/355 |
| 2007/0221668 A1 * | 9/2007 | Baarman et al. | .............. | 219/746 |
| 2007/0222542 A1 | 9/2007 | Joannopoulos et al. | | |
| 2007/0228833 A1 * | 10/2007 | Stevens et al. | ................... | 307/45 |
| 2007/0297198 A1 * | 12/2007 | Chang | ............................. | 363/17 |
| 2008/0157603 A1 * | 7/2008 | Baarman et al. | .............. | 307/104 |
| 2008/0211478 A1 * | 9/2008 | Hussman et al. | ............. | 323/355 |
| 2009/0010028 A1 * | 1/2009 | Baarman et al. | ................. | 363/25 |
| 2009/0189565 A1 * | 7/2009 | Cheng et al. | ................... | 320/108 |
| 2009/0212628 A1 * | 8/2009 | Baarman | ...................... | 307/31 |
| 2010/0072826 A1 * | 3/2010 | Baarman et al. | .............. | 307/104 |
| 2010/0103702 A1 * | 4/2010 | Baarman | ......................... | 363/16 |
| 2010/0219791 A1 * | 9/2010 | Cheng et al. | ................... | 320/108 |

FOREIGN PATENT DOCUMENTS

| | | |
|---|---|---|
| JP | 2002-078250 | 3/2002 |
| JP | 2009-106136 | 5/2009 |
| JP | 2010-051137 | 3/2010 |

OTHER PUBLICATIONS

Japanese Patent Office Action corresponding to Japanese Serial No. 2008-225295 dated Jun. 15, 2010.

* cited by examiner

*Primary Examiner* — Jared Fureman
*Assistant Examiner* — Alfonso Perez Borroto
(74) *Attorney, Agent, or Firm* — SNR Denton US LLP

(57) ABSTRACT

An electromagnetic resonance non-contact power transmission device includes a transmitter including a transmitter resonance element having a mechanism for discretely or continuously varying a resonant frequency, a transmitter excitation element coupled to the transmitter resonance element by electromagnetic induction, and an alternating current source for applying an alternating current at the same frequency as the resonant frequency to the transmitter excitation element, and a plurality of receivers each including a receiver resonance element having a specific resonant frequency, a receiver excitation element coupled to the receiver resonance element by electromagnetic induction, and an output circuit for outputting an electric current induced by the receiver excitation element. Electric power is transmitted selectively from the transmitter to any of the receivers having different specific resonant frequencies by changing the resonant frequency of the transmitter.

7 Claims, 17 Drawing Sheets

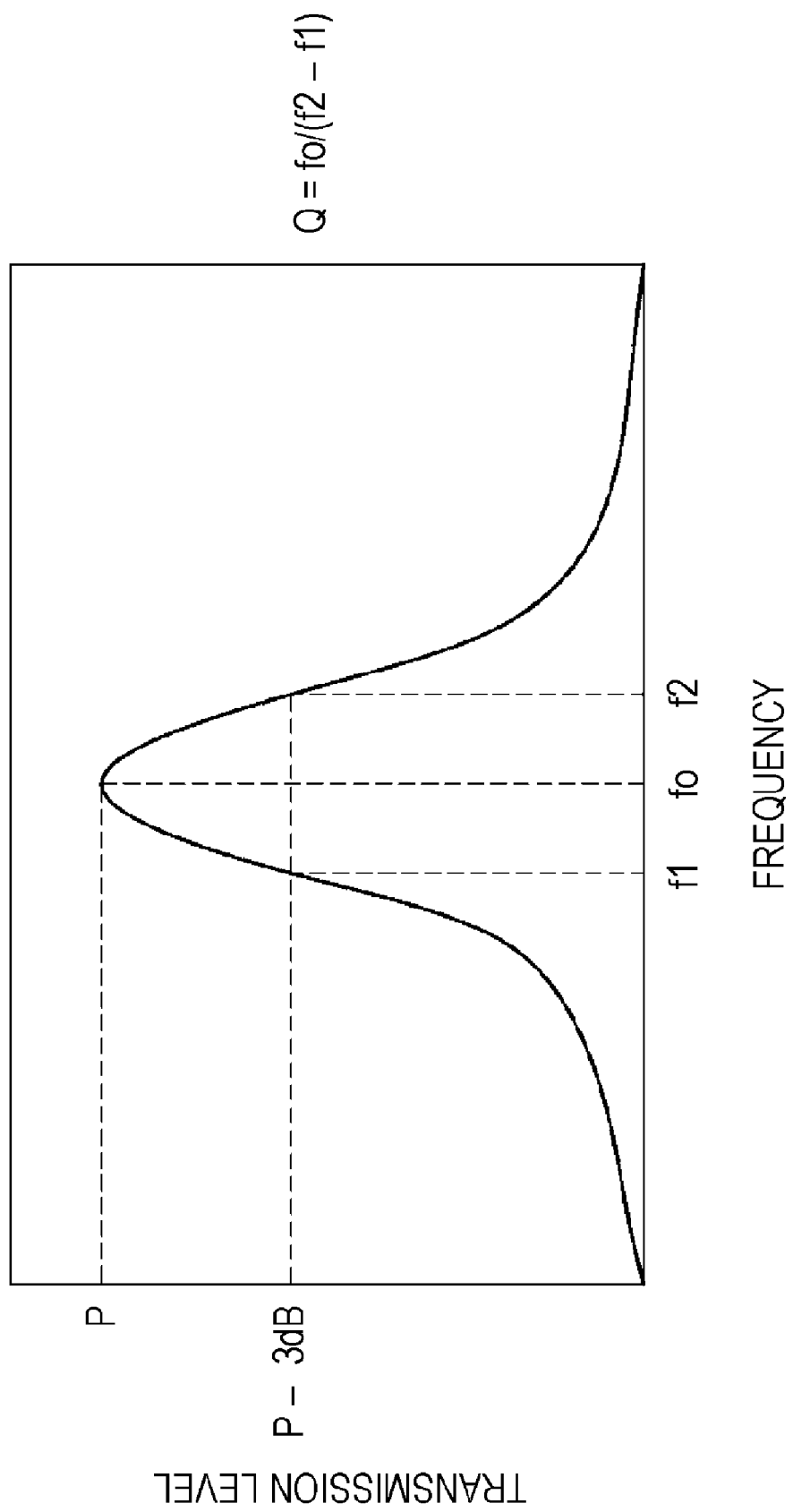

NON-CONTACT POWER TRANSMISSION DEVICE

BACKGROUND OF THE INVENTION

1. Field of the Invention

The present invention relates to non-contact power transmission devices for performing wireless electric power transmission.

2. Description of the Related Art

Recently, non-contact power supply devices which wirelessly supply electric power to apparatuses without power cables or the like have come to be in practical use. The principles upon which wireless electric power transmission is realized are generally categorized into three types: electromagnetic induction type; radio reception type; and resonance type.

Electromagnetic induction non-contact power transmission employs the phenomenon in which application of an electric current to one of adjacent coils induces an electromotive force in the other coil with magnetic flux as the medium. This technique has gradually become widespread in non-contact charging of mobile terminals.

In radio reception non-contact power transmission, radio wave energy is transmitted and received using antennas, and AC waveforms of radio waves are converted into DC waveforms using rectifier circuits, without using amplifiers or the like.

Resonance non-contact power transmission utilizes either electric resonance or magnetic resonance. For example, United States Patent Application Publication No. 2007/0222542 discloses a technique of transferring electric power using magnetically coupled resonators.

SUMMARY OF THE INVENTION

Non-contact power transmission devices utilizing electromagnetic induction have been in widespread use. However, there is no frequency selectivity for power transmission between a power transmitter and a power receiver. Therefore, a transmitter may unintentionally supply power to a plurality of receivers located adjacent a target receiver at the same time.

The present invention has been made in view of the above circumstance. Accordingly, there is a need for a non-contact power transmission device capable of supplying power selectively to a specific receiver.

According to an embodiment of the present invention, an electromagnetic resonance non-contact power transmission device includes a transmitter including a transmitter resonance element having a mechanism for discretely or continuously varying a resonant frequency, a transmitter excitation element coupled to the transmitter resonance element by electromagnetic induction, and an alternating current source for applying an alternating current at the same frequency as the resonant frequency to the transmitter excitation element, and a plurality of receivers each including a receiver resonance element having a specific resonant frequency, a receiver excitation element coupled to the receiver resonance element by electromagnetic induction, and an output circuit for outputting an electric current induced by the receiver excitation element. According to the non-contact power transmission device, electric power is transmitted selectively from the transmitter to any of the plurality of receivers having different specific resonant frequencies by changing the resonant frequency of the transmitter.

According to an embodiment of the present invention, a transmitter includes a transmitter resonance element having a mechanism for discretely or continuously varying a resonant frequency and an alternating current source for applying an alternating current at the same frequency as the resonant frequency. This allows electric power to be supplied selectively to one of receivers having different specific resonant frequencies.

BRIEF DESCRIPTION OF THE DRAWINGS

FIG. 14 shows frequency characteristics of Q factor and transmission level;

DESCRIPTION OF THE PREFERRED EMBODIMENTS

Embodiments of the present invention will be described below in the following sequence with reference to corresponding drawings.

1. First embodiment (FIG. 1 to FIG. 4)
2. Second embodiment (FIG. 5 to FIG. 8)
3. Third embodiment (FIG. 9 to FIG. 14)
4. Fourth embodiment (FIG. 15)
5. Fifth embodiment (FIG. 16)
6. Sixth embodiment (FIG. 17)

Electromagnetic resonance involves electric resonance and magnetic resonance. In each of the following embodiments, a non-contact power transmission device utilizing magnetic resonance will be described.

First Embodiment

Figure 1:
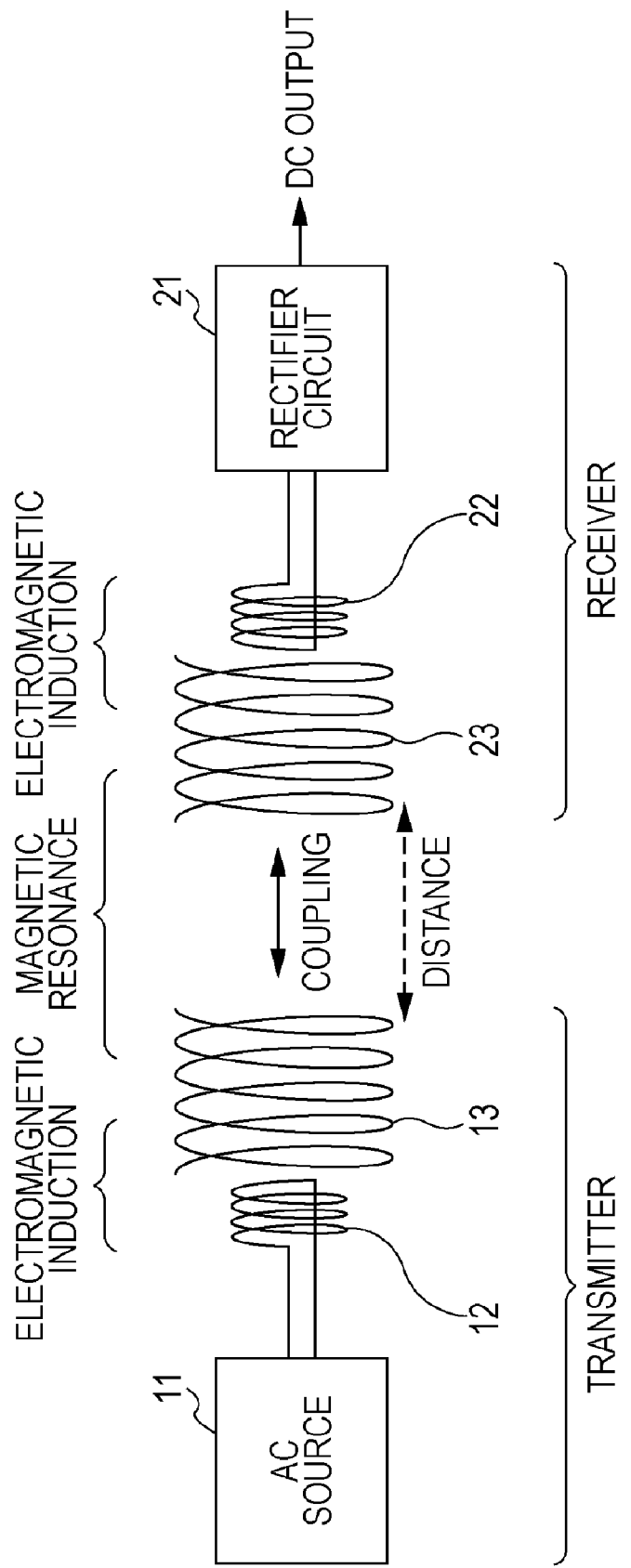
FIG. 1 illustrates a configuration of a non-contact power transmission device according to a first embodiment.

FIG. 1 illustrates a configuration of a non-contact power transmission device according to the first embodiment of the present invention. The non-contact power transmission device according to the first embodiment has a one-to-one correspondence of a transmitter and a receiver. As illustrated in FIG. 1, the transmitter has an alternating current (AC) source 11, an excitation element 12, and a resonance element 13. The receiver has a rectifier circuit 21, an excitation element 22, and a resonance element 23.

The excitation elements 12 and 22 and the resonance elements 13 and 23 are each formed of an air-core coil of a wound wire to utilize inductance. The excitation element 12 and the resonance element 13 of the transmitter are strongly coupled by electromagnetic induction. Similarly, the excitation element 22 and the resonance element 23 are strongly coupled by electromagnetic induction.

The resonance element 13 and the resonance element 23 are disposed at relative positions that satisfy a magnetic resonance relation therebetween. The coincidence of the self-resonant frequencies of the air-core coils of the resonance element 13 and the resonance element 23 produces magnetic resonance, maximizes the coupling, and minimizes energy loss.

The AC source 11 supplies an alternating current to the excitation element 12 thereby inducing an electric current in the resonance element 13. The frequency of the alternating current generated in the AC source 11 is assumed to be the same as the self-resonant frequencies of the resonance element 13 and the resonance element 23.

The rectifier circuit 21 rectifies an alternating current to a direct current and outputs the direct current.

When an alternating current is supplied from the AC source 11 to the excitation element 12, a current is induced in the resonance element 13 by electromagnetic induction. Since the resonance element 13 and the resonance element 23 are disposed at relative positions which satisfy a magnetic resonance relation therebetween, the alternating current is supplied from the resonance element 13 to the resonance element 23 at a resonant frequency without direct contact of the resonance element 13 with the resonance element 23. Then, a current is supplied from the resonance element 23 to the excitation element 22 by electromagnetic induction, and thus a direct current is output from the rectifier circuit 21.

Figure 2:
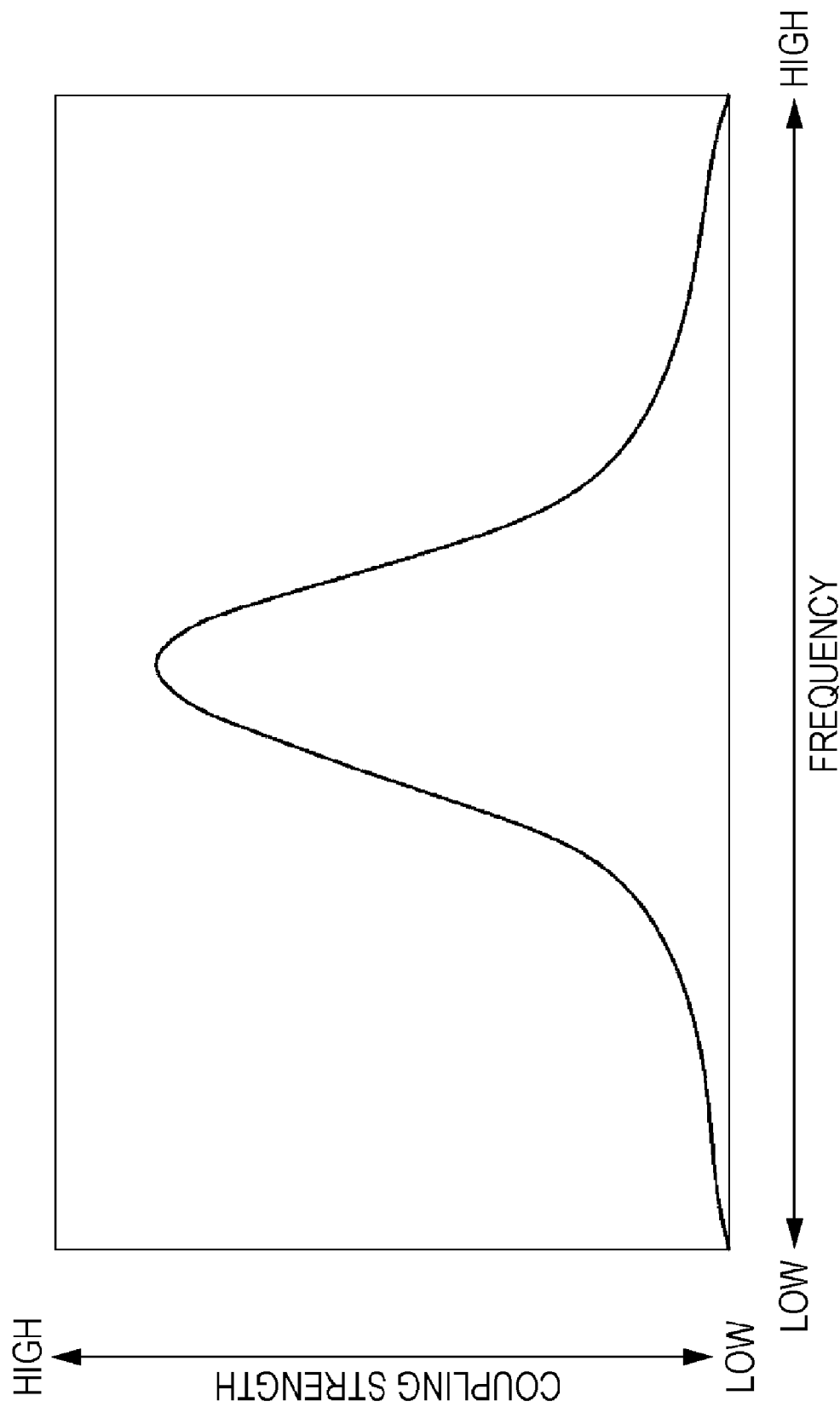
FIG. 2 illustrates a relationship between the frequency of an AC power source and the coupling strength.
Figure 3:
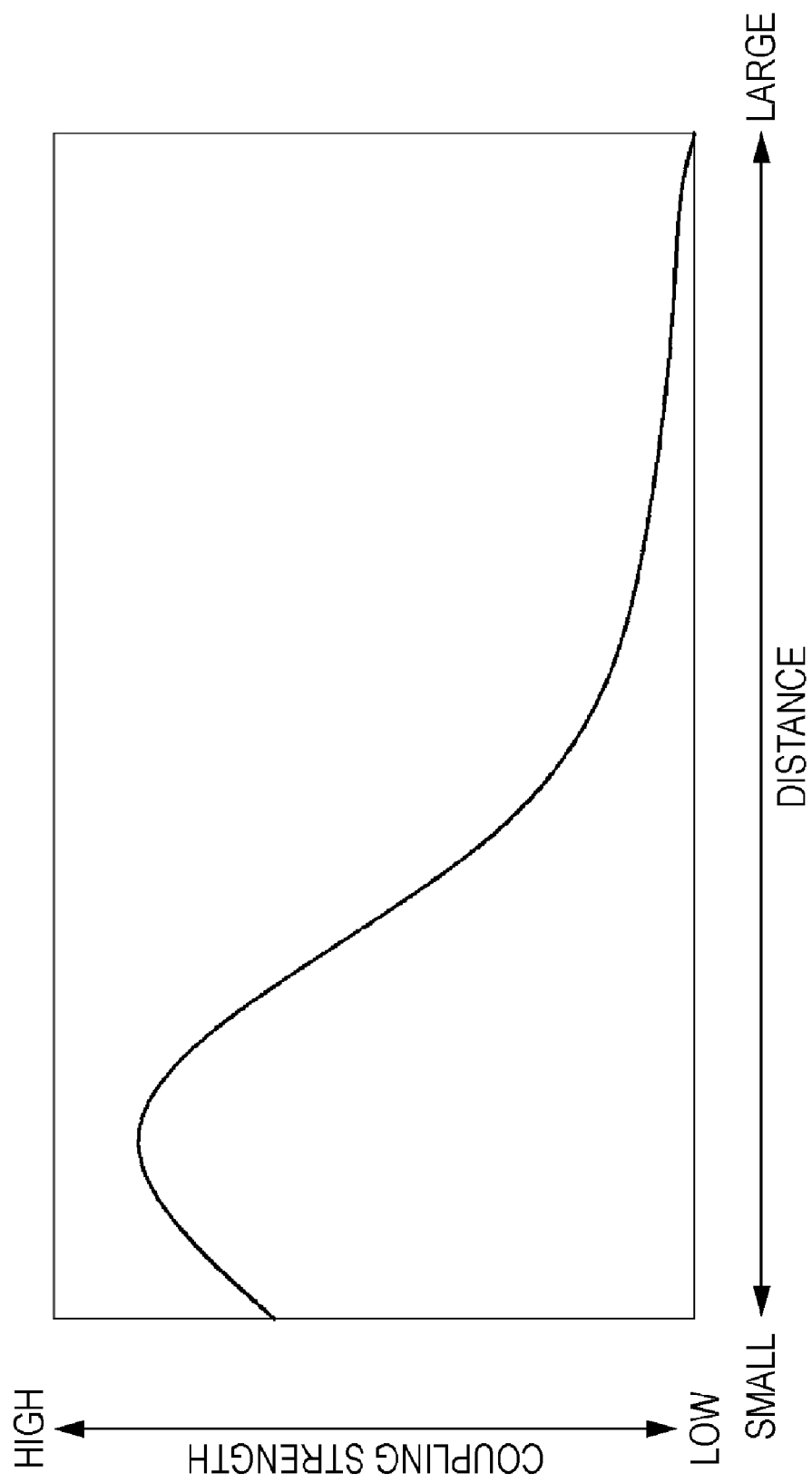
FIG. 3 illustrates a relationship between the distance between resonance elements and the coupling strength.
Figure 4:
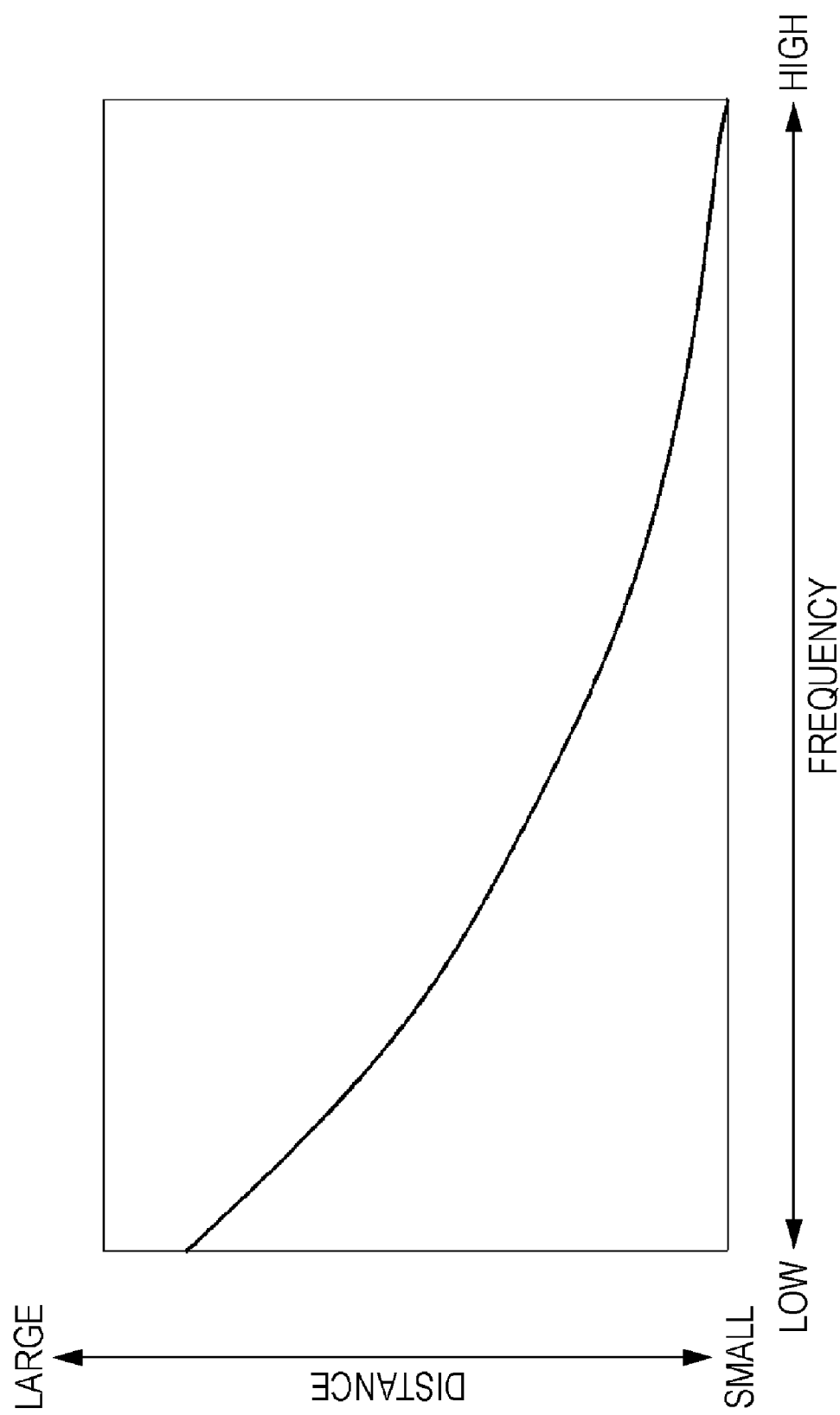
FIG. 4 illustrates a relationship between the resonant frequency and the distance between resonance elements which maximizes coupling strength.

Referring now to FIG. 2 to FIG. 4, a resonance relation will be described. FIG. 2 illustrates a relationship between the frequency of an AC source and the coupling strength. FIG. 2 also indicates that magnetic resonance is associated with frequency selectivity. FIG. 3 illustrates a relationship between the distance between resonance elements and the coupling strength. FIG. 3 also indicates that there is a certain distance between the resonance elements that maximizes the coupling strength at a resonance frequency. FIG. 4 illustrates a relationship between the resonant frequency and the distance between resonance elements that maximizes the coupling strength. FIG. 4 also indicates that the maximized coupling strength can be achieved by increasing the distance between resonance elements at lower resonant frequencies and by decreasing the distance between resonance elements at higher resonant frequencies.

In the electromagnetic induction non-contact power transmission technique which has already been in widespread use, it is necessary for a transmitter and a receiver to share magnetic flux and to be disposed very close to one another for efficient power supply. Thus, precise alignment of the coupling axis is important.

On the other hand, in the non-contact power transmission technique utilizing electromagnetic resonance, electromagnetic resonance makes it possible to transmit electric power from a transmitter to a receiver with increased distance therebetween compared with the case of the electromagnetic induction type. In addition, less precise alignment of the coupling axis does not cause a significant decrease in transmission efficiency.

Second Embodiment

Figure 5:
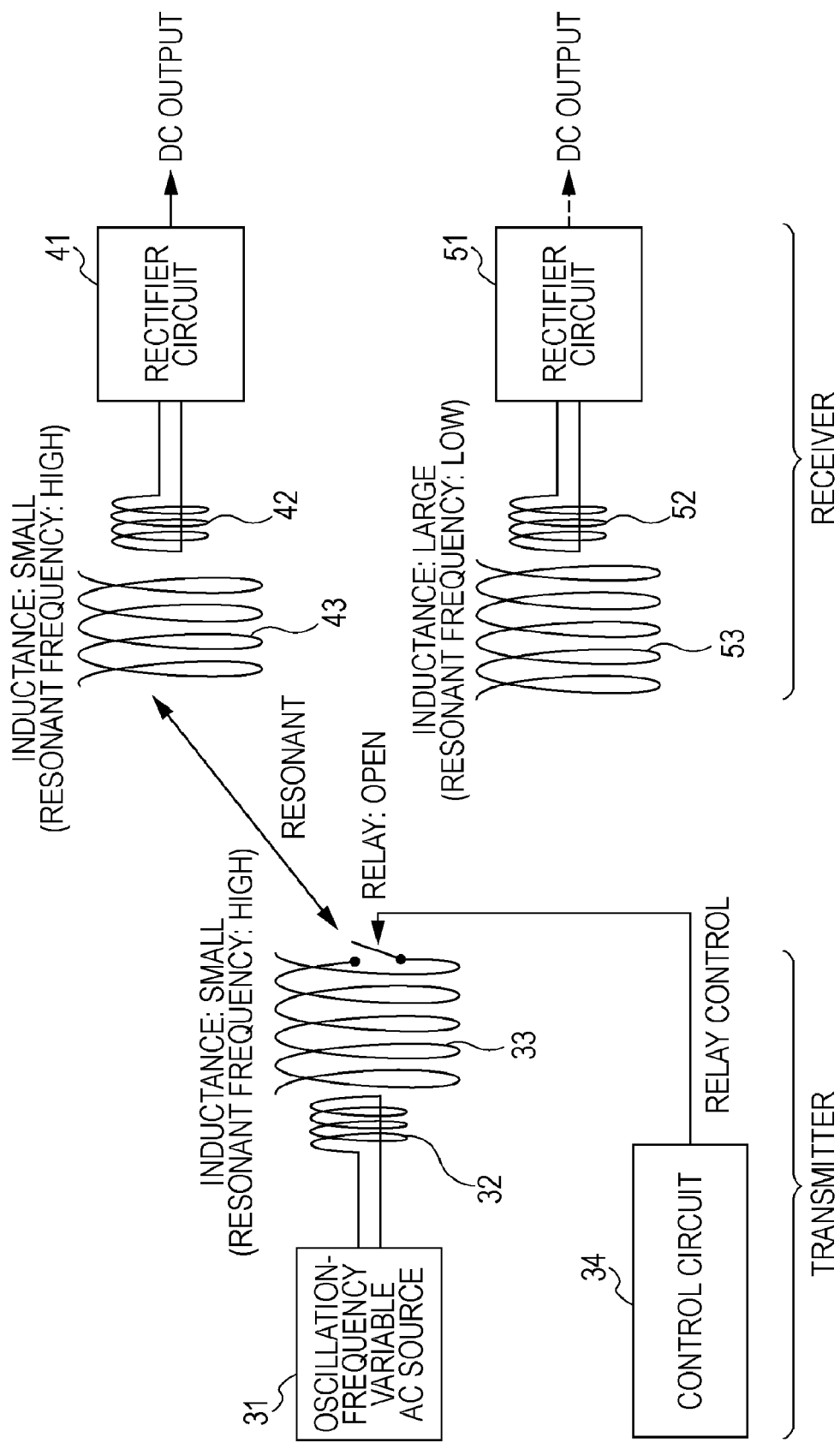
FIG. 5 illustrates a configuration of a non-contact power transmission device according to a second embodiment.

FIG. 5 illustrates a configuration of a non-contact power transmission device according to the second embodiment of present invention. The non-contact power transmission device according to the second embodiment has one transmitter and two receivers. That is, the non-contact power transmission device has a one-to-two correspondence between the transmitter and the receivers.

The transmitter has an oscillation-frequency variable AC source 31 for applying an alternating current, an excitation element 32, and a resonance element 33 of which the resonant frequency is variable.

The oscillation-frequency variable AC source 31 is an alternating current source with variable alternating current frequency which supplies an alternating current to the excitation element 32, thereby inducing a current in the resonance element 33 by electromagnetic induction. The frequency of an alternating current generated in the oscillation-frequency variable AC source 31 can be controlled so as to be the same as the self-resonant frequency of a resonance element 43 of a first receiver or a resonance element 53 of a second receiver.

The excitation element 32 and the resonance element 33 are each formed of an air-core coil of a wound wire to utilize inductance. The excitation element 32 and the resonance element 33 are strongly coupled by electromagnetic induction.

The wire length of the coil of the resonance element 33 can be changed by opening and closing a relay, and thus switching between a first state in which the inductance is small and a second state in which the inductance is large is permitted. Specifically, when the relay is open, the coil has a short wire length and the resonant frequency of the resonance element 33 of the transmitter coincides with that of the resonance element 43 of the first receiver. On the other hand, when the relay is closed, the coil has a long wire length and the resonant frequency of the resonance element 33 of the transmitter coincides with that of the resonance element 53 of the second receiver.

The transmitter also has a control circuit 34 for controlling opening and closing of the relay of the resonance element 33. The control circuit 34 also shifts the frequency of the alternating current generated in the oscillation-frequency variable AC source 31, between the self-resonant frequencies of the resonance element 43 and the resonance element 53 of the receivers.

The first receiver has a rectifier circuit 41, an excitation element 42, and the resonance element 43. The rectifier circuit 41 rectifies an alternating current to a direct current and outputs the direct current. The excitation element 42 and the resonance element 43 are each formed of an air-core coil of a wound wire to utilize inductance and are strongly coupled by electromagnetic induction.

The second receiver has a specific resonant frequency that is different from the resonant frequency of the first receiver. The second receiver has a rectifier circuit 51, an excitation element 52, and a resonance element 53. The rectifier circuit 51 rectifies an alternating current to a direct current and outputs the direct current. The excitation element 52 and the resonance element 53 are each formed of an air-core coil of a wound wire to utilize inductance and are strongly coupled by electromagnetic induction.

When power is transmitted selectively to the first receiver, the control circuit 34 opens the relay of the resonance element 33, so that the resonant frequency of the resonance element 33 matches that of the resonance element 43 of the first receiver and that the AC source 31 also has the same frequency. With this arrangement, the resonance element 33 of the transmitter and the resonance element 43 of the first receiver are brought into magnetic resonance. As a result, power is wirelessly supplied to the first receiver and a direct current is obtained by the rectifier circuit 41.

Figure 6:
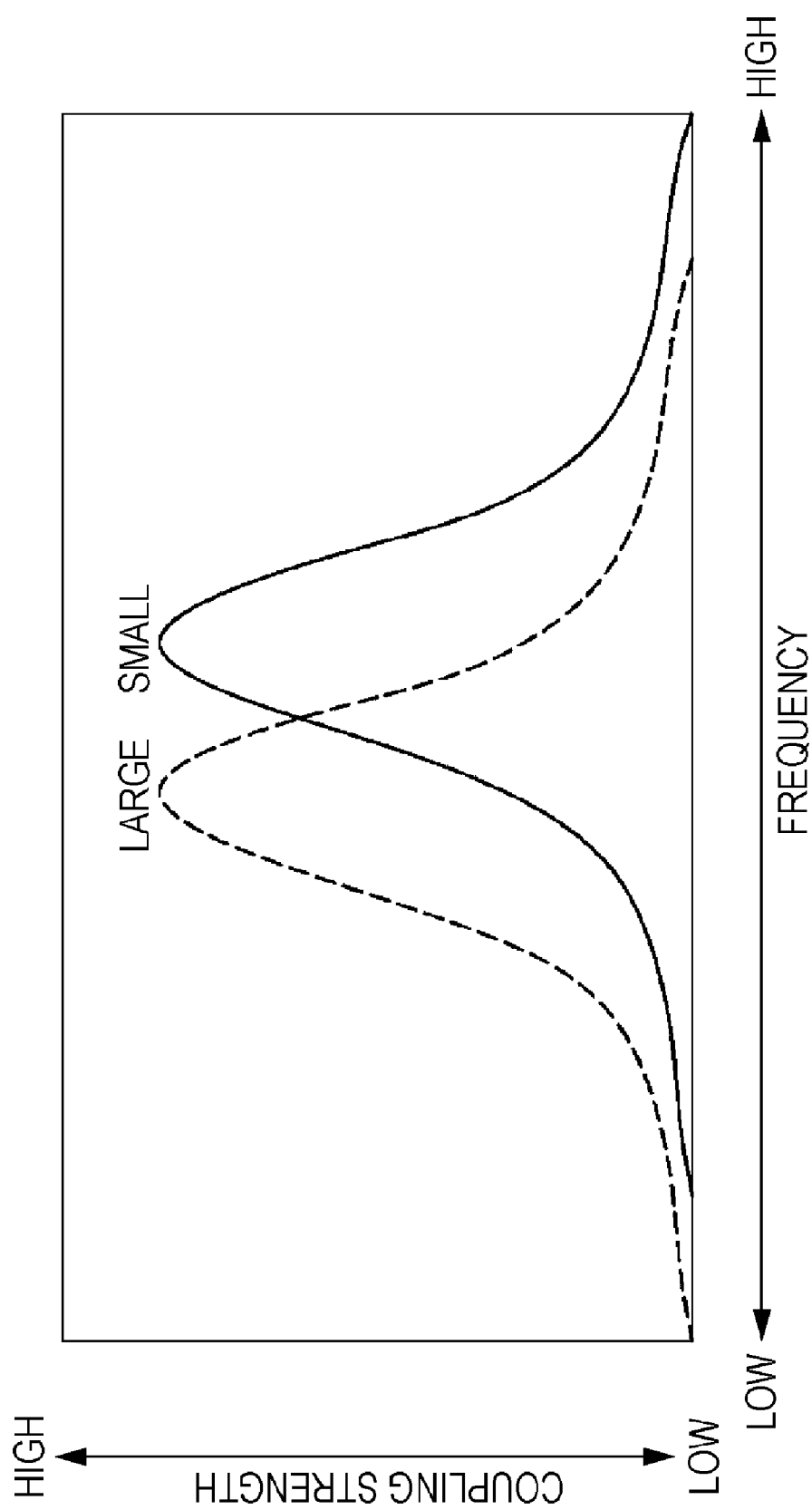
FIG. 6 shows frequency characteristics of coupling strength when inductance is small.
Figure 7:
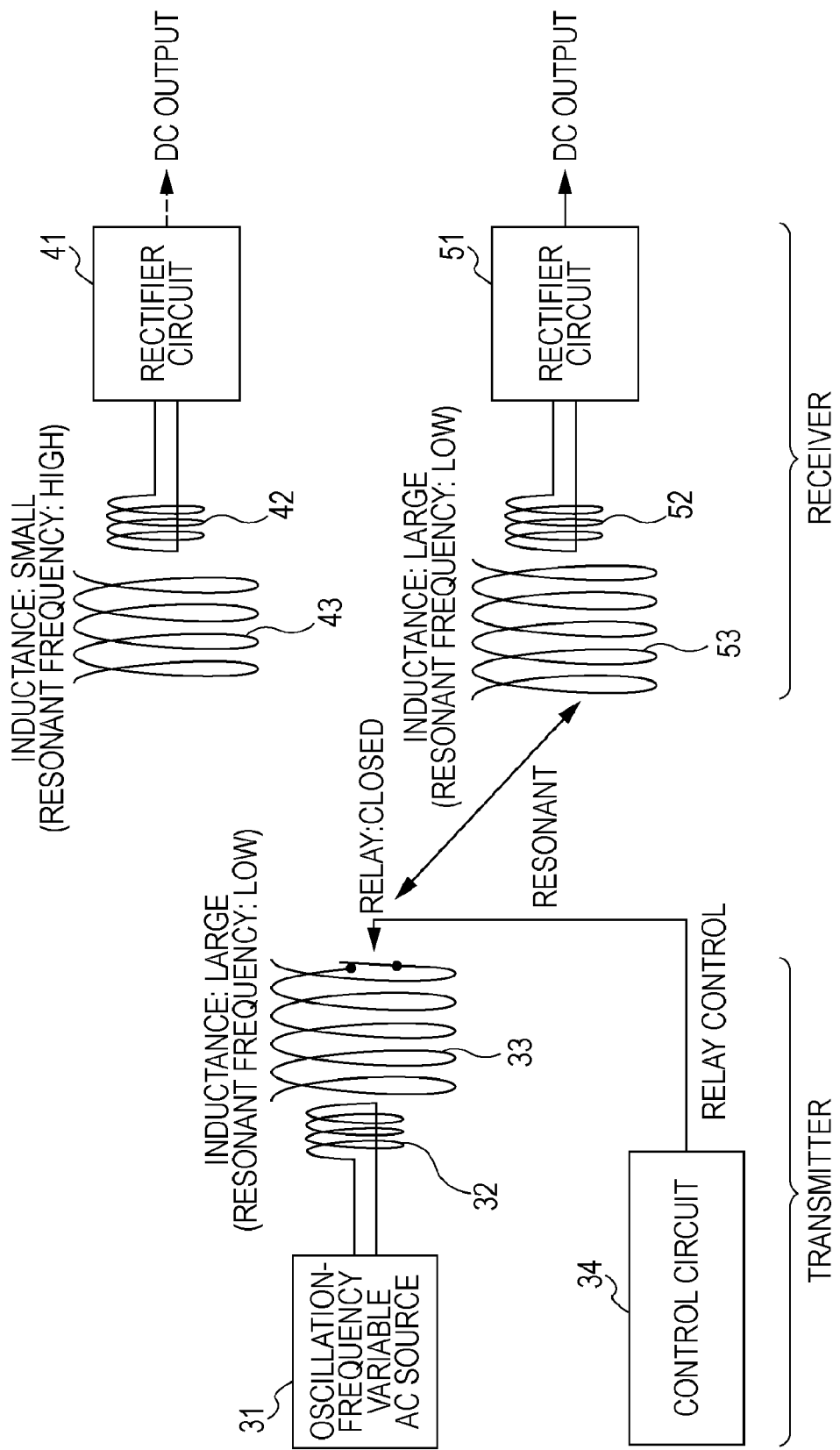
FIG. 7 illustrates power transmission when inductance is large.

At this time, the resonance element 33 of the transmitter and the resonance element 43 of the first receiver are in the first state, in which the inductance is small. In this state, the resonant frequency is high as shown in FIG. 6. On the other hand, the resonance element 53 of the second receiver is in the second state, in which the inductance is large, and the resonance element 33 of the transmitter and the resonance element 53 of the second receiver are not in resonance. Thus, power is not transferred to the second receiver.

In contrast, when power is transmitted selectively to the second receiver, the control circuit 34 closes the relay of the resonance element 33, so that the resonant frequency of the resonance element 33 matches that of the resonance element 53 of the second receiver and that the AC source 31 also has the same frequency. With this arrangement, the resonance element 33 of the transmitter and the resonance element 53 of the second receiver are brought into resonance. As a result, power is wirelessly supplied to the second receiver and a direct current is obtained by the rectifier circuit 51.

Figure 8:
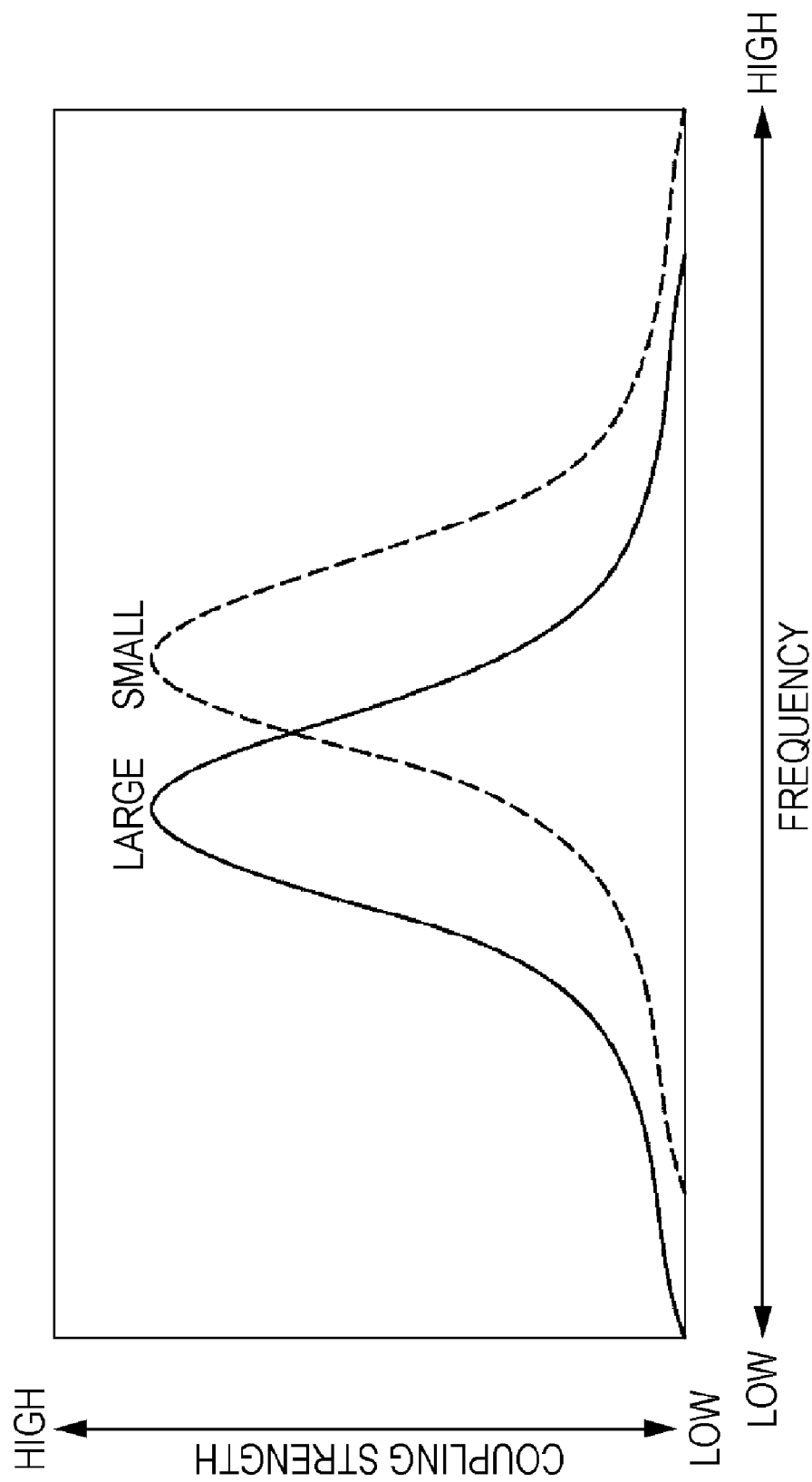
FIG. 8 shows frequency characteristics of coupling strength when inductance is large.

At this time, the resonance element 33 of the transmitter and the resonance element 53 of the second receiver are in the second state, in which the inductance is large. In this state, the resonant frequency is low, as shown in FIG. 8. On the other hand, the resonance element 43 of the first receiver is in the first state, in which the inductance is small, and the resonance element 33 of the transmitter and the resonance element 43 of the first receiver are not in resonance. Thus, power is not transferred to the first receiver.

As described above, a destination of power transmission can be selected by changing the length of the wire of the coil in the transmitter. When there are three or more receivers, a power transmission destination can similarly be selected by selecting a resonant frequency from among different specific resonant frequencies.

In the second embodiment described above, the relay controlled by the control circuit 34 may be substituted by a semiconductor switch or the like. In addition, when the physical size of the coil as a resonance element is small, factors that affect resonance, including stray capacitance and inductance of a switching device such as a relay, are taken into account for selection of an element to be implemented.

Third Embodiment

Figure 9:
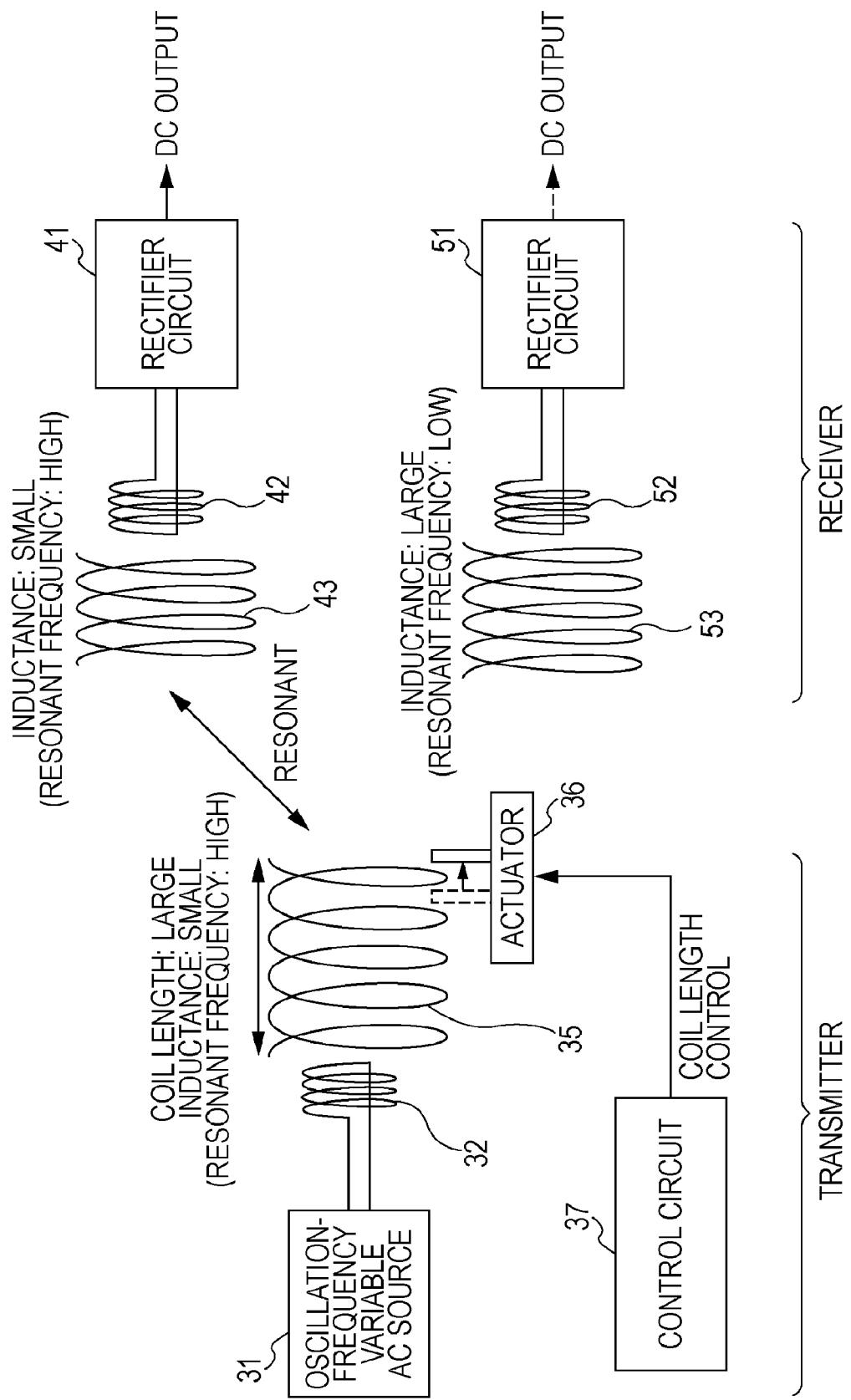
FIG. 9 illustrates a configuration of a non-contact power transmission device according to a third embodiment.

FIG. 9 illustrates a configuration of a non-contact power transmission device according to the third embodiment of the present invention. In the non-contact power transmission device according to the third embodiment, inductance is varied by changing the entire length of a coil by means of changing the winding pitch without changing the wire length, in order to vary the resonant frequency of the transmitter. Note that components similar to those of non-contact power transmission device of the second embodiment are designated by the same reference numerals used in the second embodiment, and thus the detailed description thereof will be omitted.

A transmitter has an oscillation-frequency variable AC source 31 for applying an alternating current, an excitation element 32, and a resonance element 35 of which the resonant frequency is variable.

The oscillation-frequency variable AC source 31 is an alternating current source with variable alternating current frequency and supplies an alternating current to the excitation element 32, thereby inducing a current in the resonance element 35 by electromagnetic induction. The frequency of an alternating current generated in the oscillation-frequency variable AC source 31 can be controlled so as to be the same as the self-resonant frequency of a resonance element 43 of a first receiver or the self-resonant frequency of a resonance element 53 of a second receiver.

The excitation element 32 and the resonance element 35 are each formed of an air-core coil of a wound wire to utilize inductance and are strongly coupled by electromagnetic induction.

The entire length of the coil of the resonance element 35 is physically changed by an actuator 36 which can be operated from the outside. When the winding diameter and the wire length are constant, the inductance of a loosely wound coil having space between adjacent turns of winding relatively decreases with increasing space between adjacent turns and thus increasing length of the entire coil, and the self-resonant frequency increases. On the other hand, the inductance of the coil relatively increases with decreasing space between adjacent turns and thus decreasing length of the entire coil, and the self-resonant frequency decreases.

The actuator 36 continuously changes the entire length of the coil of the resonance element 35 to continuously change the resonant frequency.

The non-contact power transmission device also has a control circuit 37 for controlling the changing of the entire length of the coil of the resonance element 35. The control circuit 37 also shifts the frequency of the alternating current generated in the oscillation-frequency variable AC source 31, between the self-resonant frequency of a resonance element 43 of a first receiver and the self-resonant frequency of a resonance element 53 of a second receiver.

The first receiver and the second receiver are configured similarly to those in the second embodiment described above, and each has a specific resonant frequency.

When power is transmitted selectively to the first receiver, as illustrated in FIG. 9, the entire length of the coil is increased by the actuator 36 controlled by the control circuit 37, so that the resonance element 35 of the transmitter has the same resonant frequency as the resonance element 43 of the first receiver and that the oscillation-frequency variable AC source 31 also has the same frequency. With this arrangement, the resonance element 35 of the transmitter and the resonance element 43 of the first receiver are brought into resonance. Thus, power is wirelessly transmitted to the first receiver, and a direct current is obtained by the rectifier circuit 41.

Figure 10:
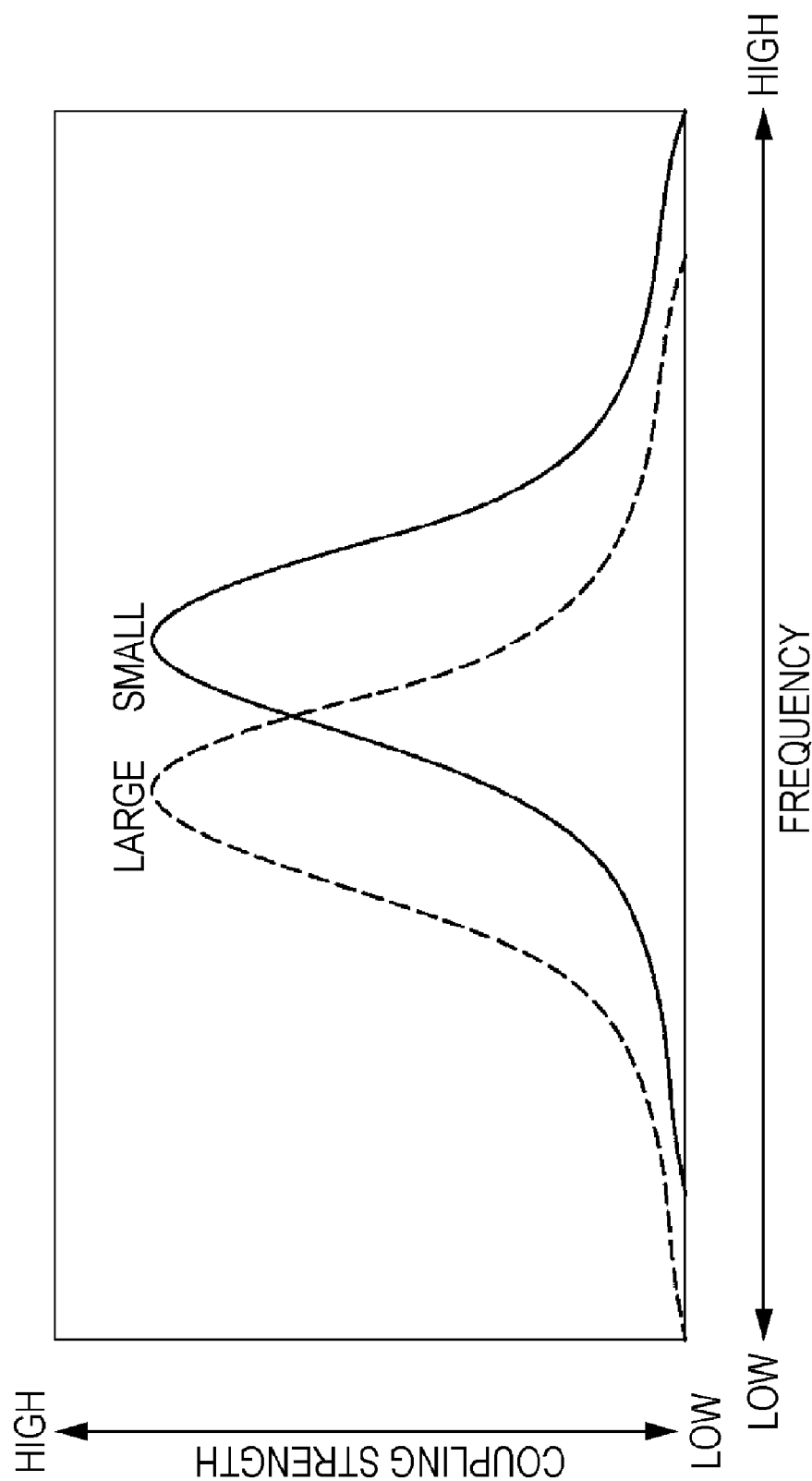
FIG. 10 shows frequency characteristics of coupling strength when inductance is small.

At this time, the resonance element 35 of the transmitter and the resonance element 43 of the first receiver are in the first state, in which the inductance is small. In this state, the resonant frequency is high as shown in FIG. 10. On the other hand, the resonance element 53 of the second receiver is in the second state, in which the inductance is large, and the resonance element 35 of the transmitter and the resonance element 53 of the second receiver are not in resonance. Thus, power is not transferred to the second receiver.

Figure 11:
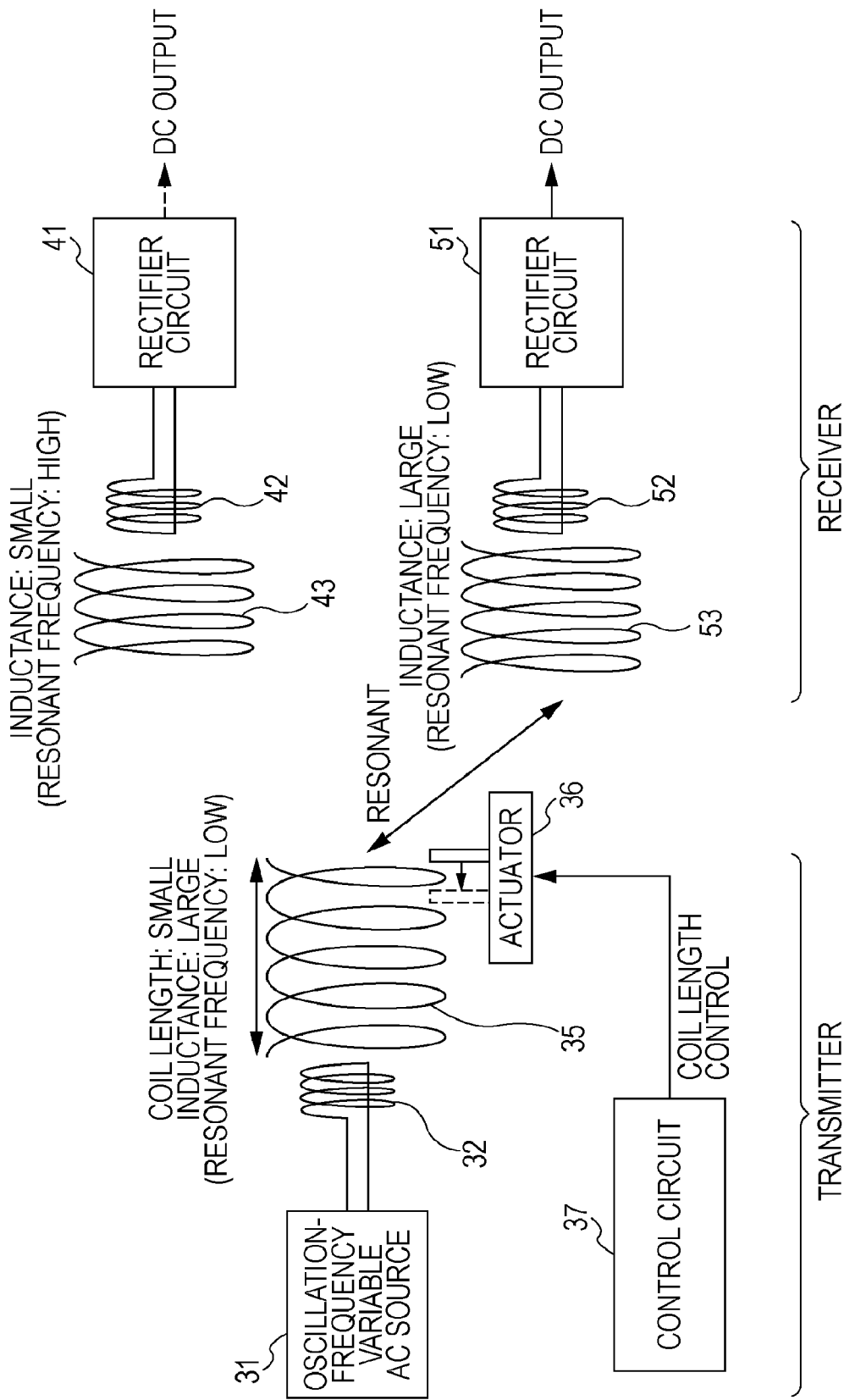
FIG. 11 illustrates power transmission when inductance is large.

In contrast, when power is transmitted selectively to the second receiver, as illustrated in FIG. 11, the entire length of the coil is decreased by the actuator 36 controlled by the control circuit 37, so that the resonance element 35 has the same resonant frequency as the resonance element 53 of the second receiver and that the oscillation-frequency variable AC source 31 also has the same frequency. With this arrangement, the resonance element 35 of the transmitter and the resonance element 53 of the second receiver are brought into resonance. Thus, power is wirelessly transmitted to the second receiver, and a direct current is obtained by the rectifier circuit 51.

Figure 12:
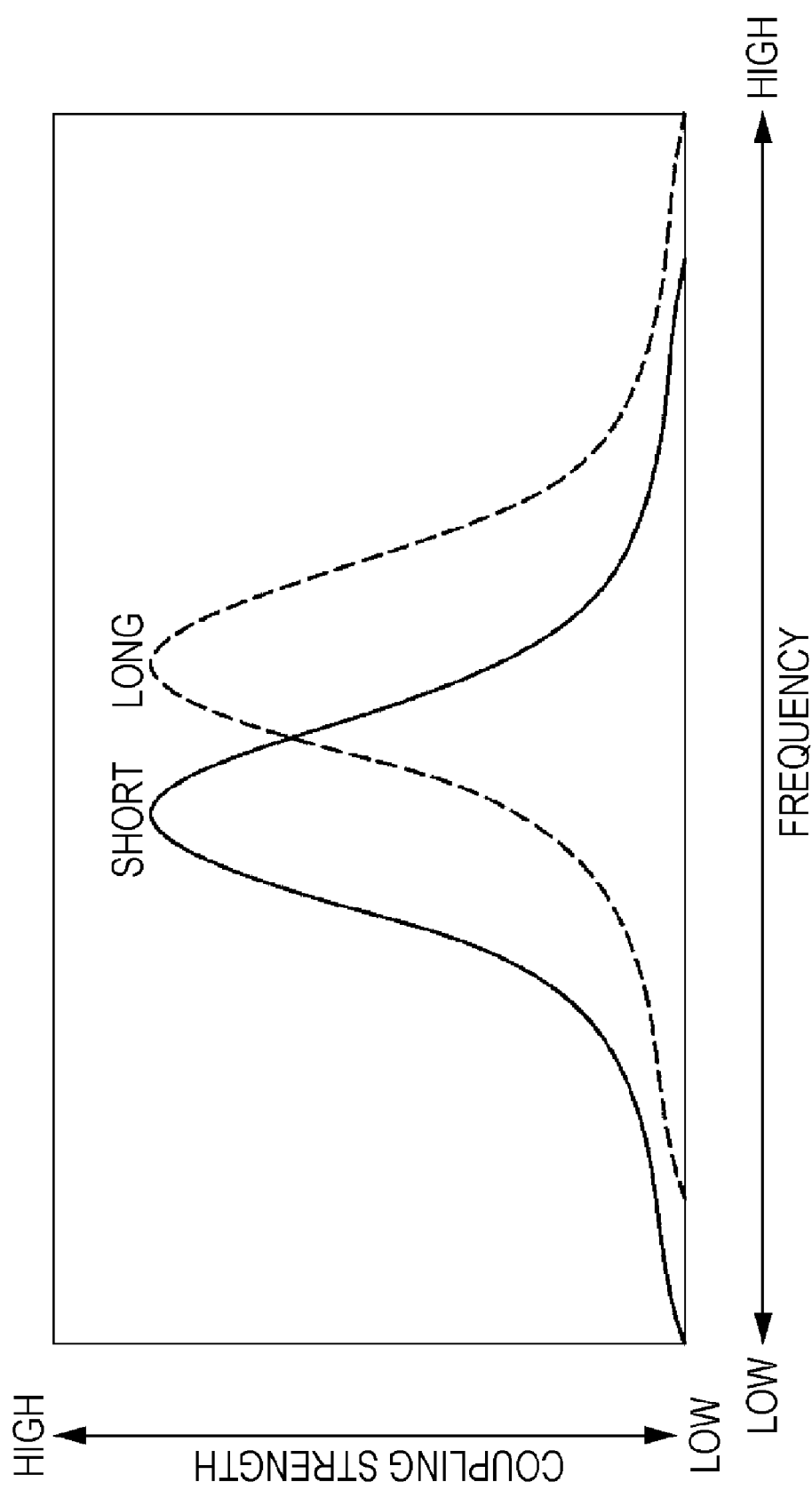
FIG. 12 shows frequency characteristics of coupling strength when inductance is large.

At this time, the resonance element 35 of the transmitter and the resonance element 53 of the second receiver are in the second state, in which the inductance is large. In this state, the resonant frequency is low as shown in FIG. 12. On the other hand, the resonance element 43 of the first receiver is in the first state, in which the inductance is small, and the resonance element 35 of the transmitter and the resonance element 43 of the first receiver are not in resonance. Thus, power is not transferred to the first receiver.

Figure 13B:
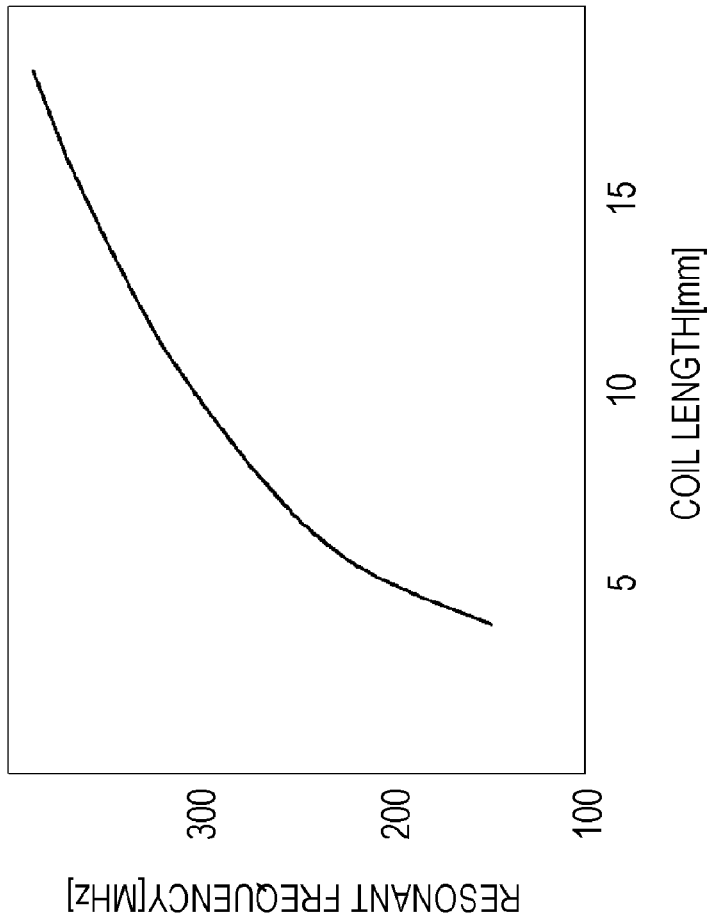
FIGS. 13A and 13B illustrate a relationship between the resonant frequency of a coil and the coil length.
Figure 13A:
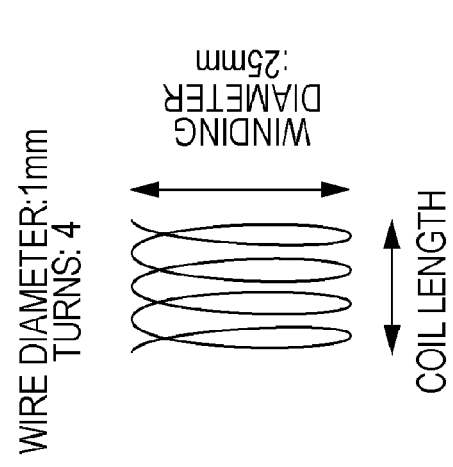

Now, the relationship between the resonant frequency of the coil of the transmitter and the coil length will be described. As illustrated in FIG. 13A, the coil has a wire diameter of 1 mm, a winding diameter of 25 mm, and a winding of 4 turns. FIG. 13B shows a profile of resonant frequency versus coil length. The graph in FIG. 14 shows frequency characteristics of transmission level and corresponding Q factor of a resonant circuit. When the Q factor of the resonant circuit is 100, and the resonant center frequency is 300 MHz, the half-width (f2−f1), which is derived from frequencies corresponding to half the peak transmission level (−3 db), is expressed as follows:

$$Q = fo/(f2-f1)$$

$$(f2-f1) = 300/100 \text{ [MHz]} = 3 \text{ [MHz]}.$$

Therefore, when the coil shown in FIG. 13A is used in the transmitter, the coil length is changed by approximately 2 mm in order to obtain sufficient selectivity for a receiver.

As described above, a destination of power transmission can be selected by changing the entire length of a coil of a receiver to vary the resonant frequency. Since the resonant frequency is to be varied by the actuator 36, a continuous change in the resonant frequency can be achieved. This makes it possible to supply power to any other receiver having a specific resonant frequency.

In addition, to maximize output from the rectifier circuits 41 and 51, a feedback circuit for adjusting the operating power of the actuator 36 controlled by the control circuit 37 may be provided.

Fourth Embodiment

Figure 15:
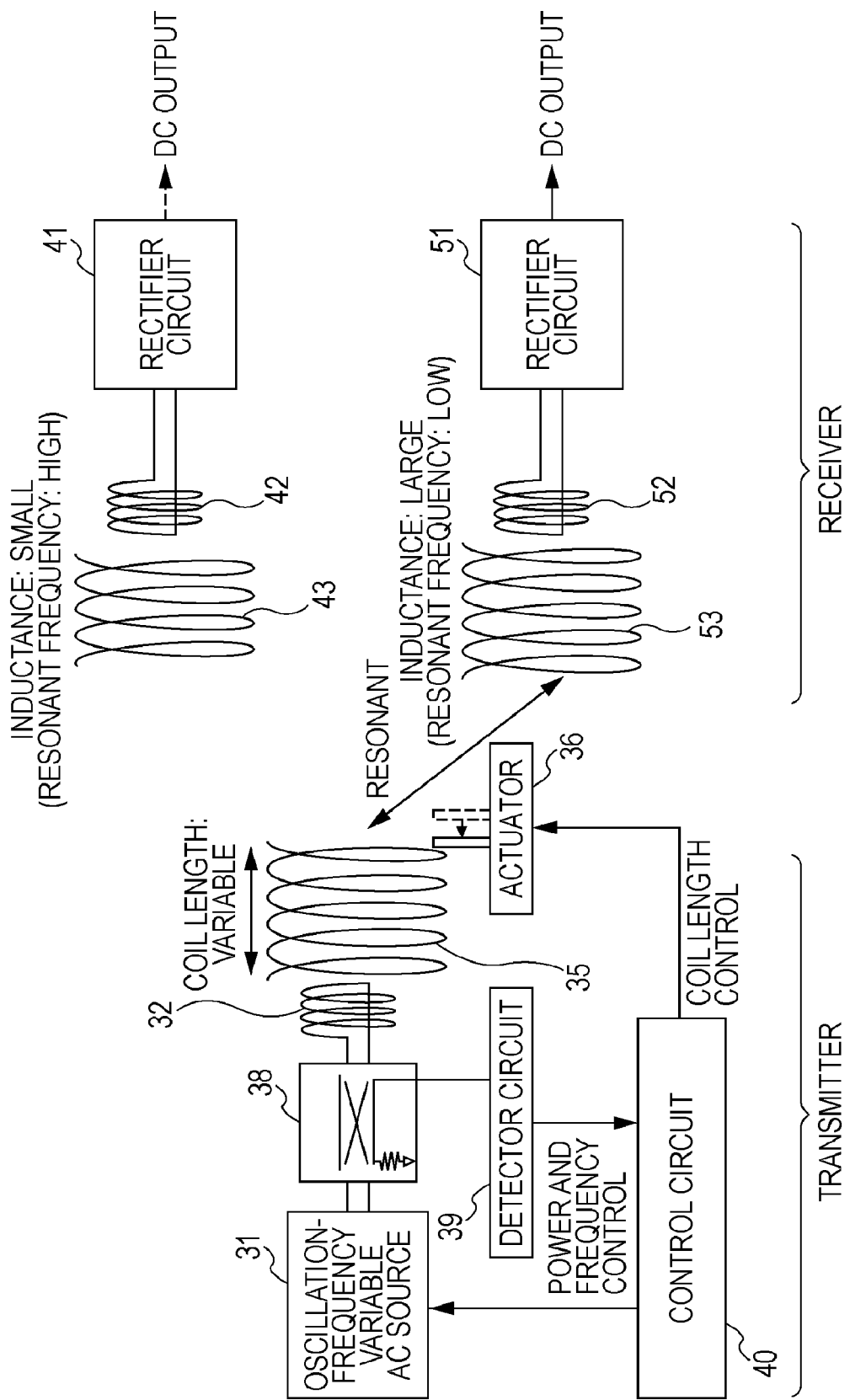
FIG. 15 illustrates a configuration of a non-contact power transmission device according to a fourth embodiment.

FIG. 15 illustrates a configuration of a non-contact power transmission device according to the fourth embodiment of the present invention. In the non-contact power transmission device according to the fourth embodiment, a load is detected on the basis of the presence or absence of reflected power from a receiver, and power supply output of a transmitter is controlled. Note that components similar to those in the non-contact power transmission device of the third embodiment are designated by the same reference numerals used in the third embodiment, and thus the detailed description thereof will be omitted.

The transmitter has an oscillation-frequency variable AC source 31, an excitation element 32, and a resonance element 35 of which the resonant frequency is variable. A directional coupler 38 is provided between the oscillation-frequency variable AC source 31 and the excitation element 32. The directional coupler 38 selectively supplies an AC component reflected from a receiver to a detector circuit 39. The detector circuit 39 detects the level of the reflected AC component and sends the detection result to a control circuit 40.

The directional coupler 38 selectively extracts a wave component reflected from a receiver.

The detector circuit 39 recovers the original signal from the reflected wave component extracted from the directional coupler 38 and detects the level of the reflected signal.

The control circuit 40 controls the changing of the entire length of the coil of the resonance element 35. The control circuit 40 also shifts the frequency of the alternating current generated in the oscillation-frequency variable AC source 31, between the self-resonant frequency of a resonance elements 43 of a first receiver and the self-resonant frequency of a resonance element 53 of a second receiver. In addition, as will be described below, the control circuit 40 controls the output power, frequency, and the like, of the oscillation-frequency variable AC source 31 on the basis of the level of the reflected signal obtained by the detector circuit 39.

The first and second receivers of the non-contact power transmission device are configured similarly to those in the second embodiment described above, and each has a specific resonant frequency.

When there is no resonance element of a receiver that is in resonance with the resonance element 35 of the transmitter, or when the distance between the transmitter and a receiver is too large to allow sufficient resonance of the transmitter and the receiver, part of the power supplied to the resonance element 35 is reflected and returned to the AC power source. The directional coupler 38 provided between the resonance element 35 and the oscillation-frequency variable AC source 31 sends the reflected AC component selectively to the detector circuit 39. The detector circuit 39 detects the level of the reflected AC component and sends the detection result to the control circuit 40. The control circuit 40 performs control of the oscillation-frequency variable AC source 31 in order to decrease or stop the AC output. The control circuit 40 also performs control of the actuator 36 in order to change the length of the coil.

In addition, the control circuit 40 continuously changes, or sweeps, the resonant frequency using the actuator 36 and monitors the output (reflected wave component) from the detector circuit 39 according to the output AC frequency so as to obtain information such as the presence or absence of a target receiver of power supply, the coupling strength, the resonant frequency of the receiver, and the presence or absence of an obstacle. Note that in such a sweep detection mode, it is preferable to decrease the AC output level taking into account possible interference with other radio systems.

As described above, reflected wave components are monitored at the power transmission source. Thus, in a case where there is no receiver that is in resonance with the transmitter, where a distance between the transmitter and a receiver is too large, or where there is an obstacle between the transmitter and a receiver, transmission of unnecessary interfering wave due to continuing power supply and circuit damage caused by reflected signals can be prevented.

Fifth Embodiment

Figure 16:
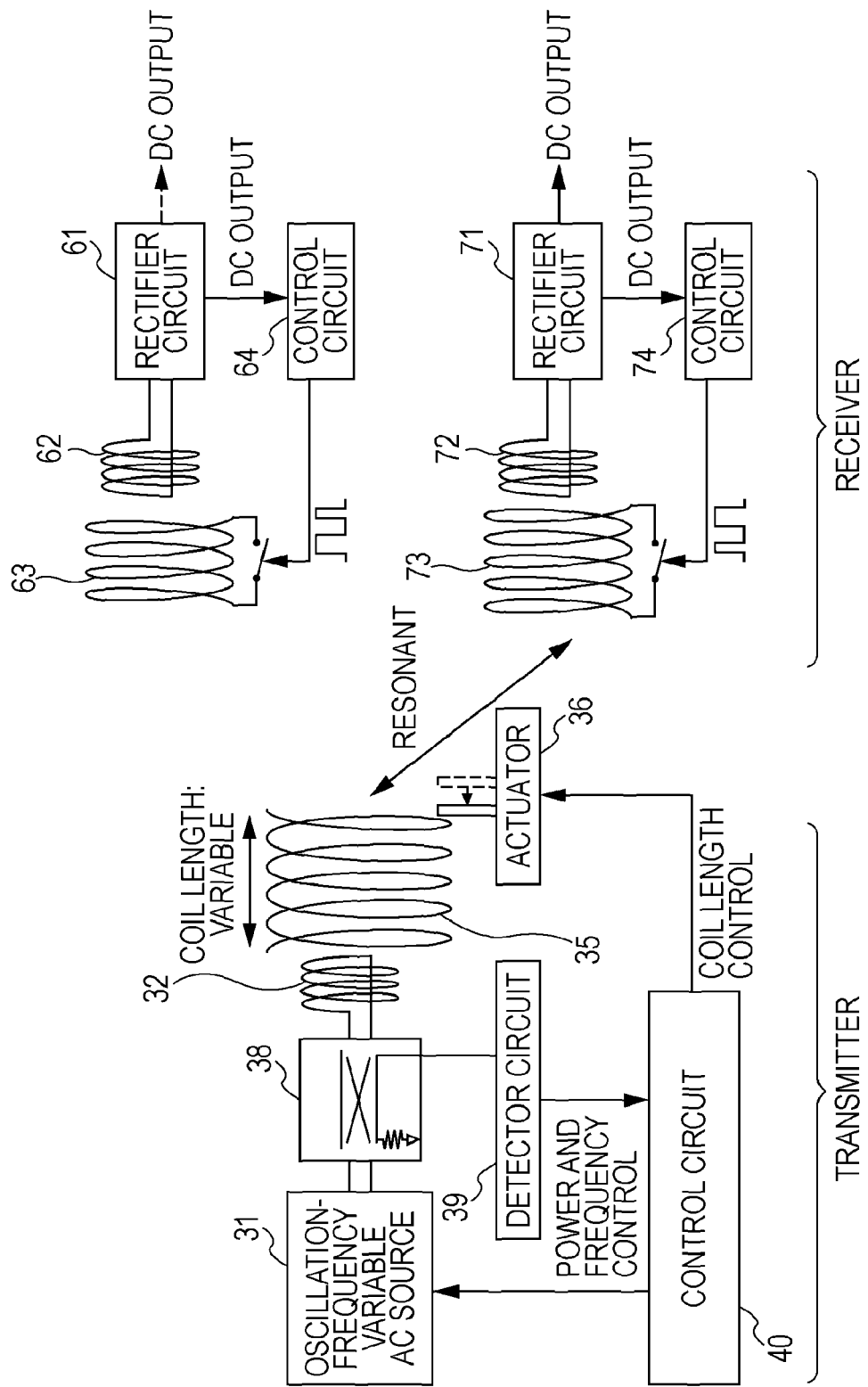
FIG. 16 illustrates a configuration of a non-contact power transmission device according to a fifth embodiment.
Figure 17:
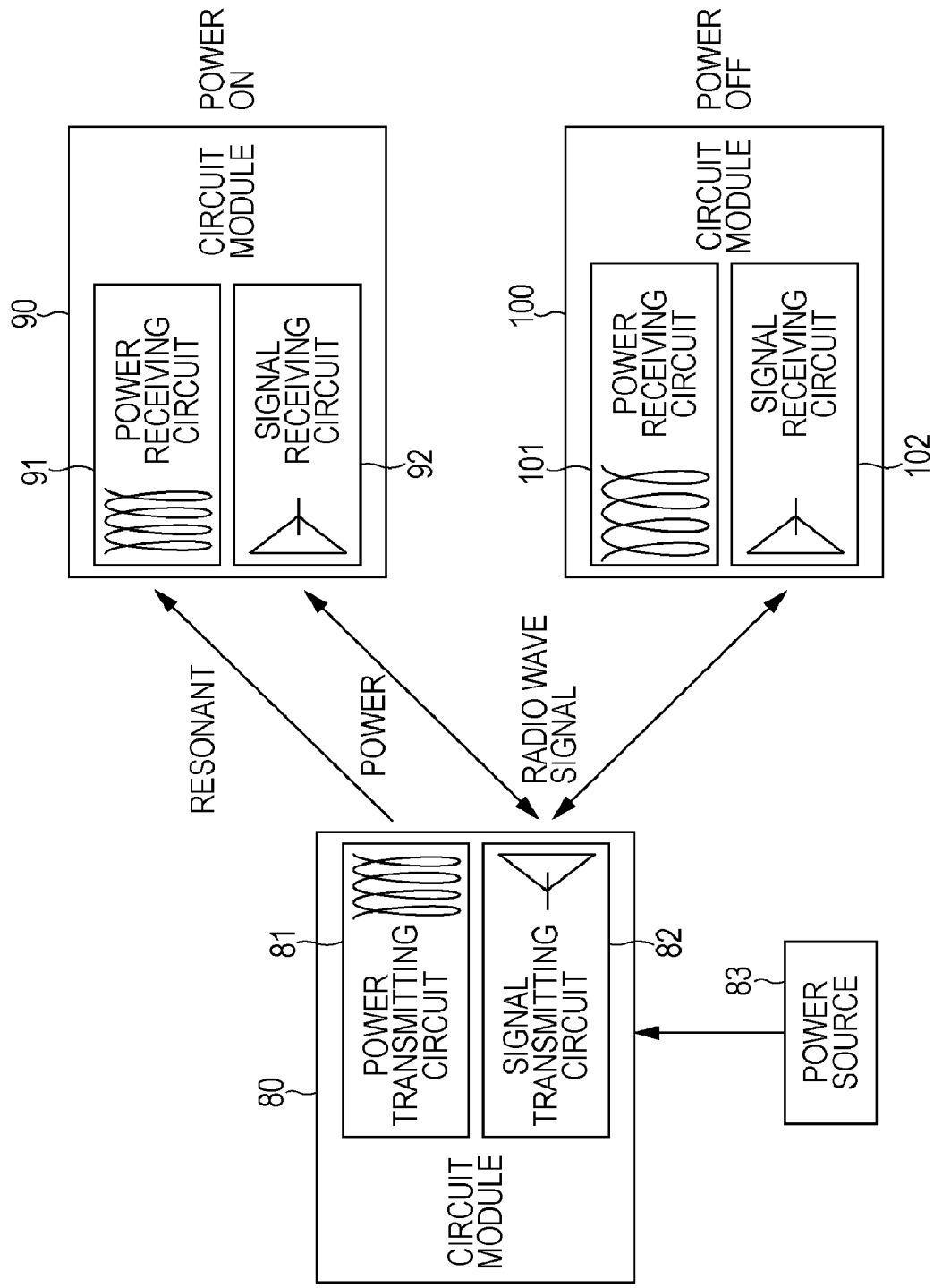
FIG. 17 illustrates a configuration of a non-contact power transmission device according to a sixth embodiment.

FIG. 16 illustrates a configuration of a non-contact power transmission device according to the fifth embodiment. In the non-contact power transmission device according to the fifth embodiment, a resonance element of a receiver is opened or closed using a relay so that the impedance monitored at the receiver is changed and corresponding information is sent to the transmitter. Note that components similar to those in the non-contact power transmission of the fourth embodiment are designated by the same reference numerals used in the fourth embodiment, and thus the detailed description thereof will be omitted.

The transmitter has an oscillation-frequency variable AC source 31, an excitation element 32, and a resonance element 35 of which the resonant frequency is variable. A directional coupler 38 is provided between the oscillation-frequency variable AC source 31 and the excitation element 32. The directional coupler 38 selectively supplies an AC component reflected from a receiver to a detector circuit 39. The detector circuit 39 detects the level of the reflected AC component and sends the detection result to a control circuit 40.

The directional coupler 38 selectively extracts a wave component reflected from a receiver.

The detector circuit 39 recovers the original signal from the reflected wave component extracted from the directional coupler 38 and detects the level of the reflected signal.

The control circuit 40 controls the changing of the entire length of the coil of the resonance element 35. The control circuit 40 also shifts the frequency of the alternating current generated in the oscillation-frequency variable AC source 31, between the self-resonant frequency of a resonance elements 43 of a first receiver and the self-resonant frequency of a resonance element 53 of a second receiver. In addition, as will be described below, the control circuit 40 controls the output power, frequency, and the like, of the oscillation-frequency variable AC source 31 on the basis of the level of the reflected signal obtained by the detector circuit 39.

The first receiver has a rectifier circuit 61, an excitation element 62, a resonance element (coil) 63 of which a resonant state can be changed by opening and closing a relay (switch), and a control circuit 64 which is driven by electric power rectified by the rectifier circuit 61 and changes the resonant state of the resonance element 63.

The second receiver is configured similarly to the first receiver and has a rectifier circuit 71, an excitation element 72, a resonance element 73, and a control circuit 74.

The impedance seen from the transmitter differs depending on whether or not the resonance elements of the transmitter and any of the receivers are in resonance. When the transmitter and the receiver are in resonance, their impedances match and the level of reflected wave energy is low. On the other hand, when the transmitter and the receiver are not in resonance or the level of resonance is low, a high level of reflected wave energy is generated. Such phenomena are utilized in the present embodiment, and electric power is supplied selectively from the transmitter to a receiver through near-field communication using reflected waves.

When the resonance element 35 of the transmitter and the resonance element 73 of the second receiver are in resonance, power is transmitted from the transmitter to the second receiver, and a direct current is supplied from the rectifier circuit 71 to the control circuit 74. As a result, the control circuit 74 operates and causes an open- or short-circuit of the coil of the resonance element 73 by opening or closing the relay (switch) so as to communicate with the transmitter. When the coil of the resonance element 73 is short-circuited, the coil is not resonant with the transmitter, which results in power reflection to the transmitter. When the coil of the resonance element 73 is open-circuited, power reflection does not occur. When the resonance element 35 of the transmitter and the resonance element 73 are in resonance, the resonance element 63 of the first receiver is not in resonance with the resonance element 35 of the transmitter, and thus the control circuit 64 of the first receiver does not operate.

The control circuit 40 of the transmitter determines the state of the second receiver on the basis of a reflected wave from the second receiver so as to control the oscillation-frequency variable AC source 31. At this time, by coding a control signal (reflected wave) supplied from the control circuit of the receiver, information such as identification code and power transmission status can be provided to the transmitter. On the basis of the information, the transmitter can easily control the output power, frequency, and the like.

Further, the above embodiment may be applied to a chargeable battery. When a chargeable battery is a target of power transmission from the transmitter, charging status information can be provided from batteries to the transmitter through reflection waves so that power is charged selectively to the target battery.

Sixth Embodiment

FIG. 17 illustrates a configuration of a non-contact power transmission device according to the sixth embodiment. According to the sixth embodiment, a radio signal transmission technique is incorporated in the non-contact power transmission device.

The non-contact power transmission device has a circuit module 80 for supplying power, a first circuit module 90 for receiving power, and a second circuit module 100 for receiving power.

The circuit module 80 has a power transmitting circuit 81 and a signal transmitting circuit 82 and is connected to a power source 83. The circuit module 90 has a power receiving circuit 91 and a signal receiving circuit 92. The circuit module 100 has a power receiving circuit 101 and a signal receiving circuit 102.

The power transmitting circuit 81 has an excitation element, a resonance element of which the resonant frequency is variable, a control circuit, and the like, as does the transmitter in the third embodiment. The power transmitting circuit 81 controls the changing of the entire length of the resonance element and also shifts an AC frequency to the self-resonant frequency of a receiver. The first power receiving circuit 91 and the second power receiving circuit 101 also each have a rectifier circuit, an excitation element, and a resonance element having a specific resonant frequency, as does each receiver in the third embodiment. The signal transmitting circuit 82 is a communication circuit for communicating with the signal receiving circuit 92 and the signal receiving circuit 102 through radio wave signals. Each of these circuits is modularized, and each module is independent of the direct current.

In order to operate only the circuit module 90 of the first receiver, a high-frequency signal according to the resonant frequency of the power receiving circuit 91 is transmitted from the circuit module 80 of the transmitter. At this time, power is not supplied to the circuit module 100 of the second receiver, unnecessary power consumption can be reduced.

Using millimeter waves in the 60 GHz band for signal transmission between the signal transmitting circuit 82 and the signal receiving circuit 92 or 102, radio waves unselectively transmitted from the circuit module 80 can be received only by the circuit module 90, to which power is being supplied.

As described above, each module is physically independent and is also independent of the direct current, a high degree of freedom in circuit arrangement can be achieved. In addition, since each circuit ground can also be configured to be independent, a high degree of freedom in arrangement for reducing unnecessary radiation and increasing immunity can be achieved.

The present application contains subject matter related to that disclosed in Japanese Priority Patent Application JP 2008-225295 filed in the Japan Patent Office on Sep. 2, 2008, the entire content of which is hereby incorporated by reference.

While examples of embodiments of the present invention have been described above, the present invention is not limited to the above embodiments and various modifications may be made on the basis of the technical thought of the present invention. In the foregoing embodiments, a non-contact power transmission device utilizing magnetic resonance has been described as an example of a device producing electromagnetic resonance. However, for example, a non-contact power transmission device utilizing electric resonance may also be used.

What is claimed is:

1. An electromagnetic resonance non-contact power transmission device comprising:
 a power signal transmitter including (a) a transmitter resonance element having a variable inductance for one of discretely and continuously varying a resonant frequency, (b) an alternating current source for applying an alternating current at a same frequency as the resonant frequency, (c) a communication unit for receiving a control signal from a first receiver within a plurality of receivers, and (d) a control unit for controlling the frequency of the alternating current and the inductance of the transmitter resonance element based on the control signal, the control unit receiving the control signal from the first receiver when the transmitter resonance element is in resonance with a second receiver within the plurality of receivers; and
 each receiver within the plurality of receivers including (a) a receiver resonance element having a specific resonant frequency and (b) an output circuit for outputting an electric current,
 wherein,
  electric power is transmitted selectively from the transmitter to any of the plurality of receivers having different specific resonant frequencies by changing the inductance of the transmitter resonance element.

2. The electromagnetic resonance non-contact power transmission device of claim 1, wherein the transmitter resonance element comprises an air-core coil, and the transmitter includes an actuator for changing a length of the air-core coil.

3. The electromagnetic resonance non-contact power transmission device of claim 2, wherein the transmitter includes a directional coupler for selectively extracting a reflected wave component and the control unit is controlling the length of the air-core coil and the frequency of the alternating current on the basis of the reflected wave component.

4. The electromagnetic resonance non-contact power transmission device of claim 3, wherein the receiver resonance element comprises an air-core coil, and each of the receivers includes a reflection control unit for controlling the generation of a reflected wave by short-circuiting the air-core coil.

5. The electromagnetic resonance non-contact power transmission device of claim 1, wherein the transmitter resonance element comprises an air-core coil, and the transmitter has a switching unit for changing a wire length of the air-core coil.

6. The electromagnetic resonance non-contact power transmission device of claim 1, wherein the control unit controls the frequency of the alternating current and the inductance of transmitter resonance element so as to maximize output of the output circuit.

7. An electromagnetic resonance non-contact power transmitter comprising:
 a power signal transmitter resonance element having a variable inductance for one of discretely and continuously varying a resonant frequency;
 an alternating current source for applying an alternating current at a same frequency as the resonant frequency;
 a communication unit for receiving a control signal from a first receiver within a plurality of receivers; and
 a control unit for controlling the frequency of the alternating current and the inductance of the transmitter resonance element based on the control signal, the control unit receiving the control signal from the first receiver when the transmitter resonance element is in resonance with a second receiver within the plurality of receivers,
 wherein,
  electric power is transmitted selectively from the transmitter to any of the plurality of receivers having different specific resonant frequencies by changing the inductance of the power signal transmitter resonance element.

* * * * *